United States Patent [19]

McDowell et al.

[11] 3,714,200

[45] Jan. 30, 1973

[54] ACID SALTS OF METHYLENEDIOXYAMINE

[75] Inventors: Curtis S. McDowell, Edwards; Claude Merrill, Lancaster, both of Calif.

[73] Assignee: The United States of America as represented by the Air Force

[22] Filed: March 17, 1970

[21] Appl. No.: 24,969

[52] U.S. Cl.................260/350, 149/88, 260/583 DD
[51] Int. Cl..............................................C07c 83/00
[58] Field of Search...............260/584 R, 584 C, 350

[56] References Cited

UNITED STATES PATENTS 3,440,251   4/1969   Pilipovich............................260/350
3,383,417   5/1968   Lichtenwalter...................260/584 R

*Primary Examiner*—Leland A. Sebastian
*Attorney*—Harry A. Herbert, Jr. and William J. O'Brien

[57] ABSTRACT

A method for synthesizing the acid salts of methylenedioxyamine by effecting a hydrolytic reaction between methylene-O,O'-bis (ethylacethydroximate) and a suitable acid such as hydrochloric, perchloric, nitric, hydrobromic, sulfuric, nitroform, or picric.

8 Claims, No Drawings

ACID SALTS OF METHYLENEDIOXYAMINE

BACKGROUND OF THE INVENTION

This invention relates to a series of novel compounds and to a method for their preparation. More particularly, this invention concerns itself with the synthesis of the acid salts of methylenedioxyamine and to a process for effecting that synthesis through the acid hydrolysis of methylene-0, 0′-bis (ethylacethydroximate). The novel compounds of this invention find utility as rocket propellant oxidizers and explosives. They are especially effective as oxidizers in solid rocket propellant systems as replacements for the well-known hydroxylamine perchlorate and hydrazine diperchlorate oxidizers.

SUMMARY OF THE INVENTION

In the present invention, the synthesis of the acid salts of methylenedioxyamine is accomplished by effecting a reaction between (1) a solvent mixture of methylene-0,0′-bis (ethylacethydroximate) and (2) a suitable acid in an amount of about 10 percent in excess of stoichiometry. The reaction is continued at a temperature and for a period of time sufficient to accomplish the acid hydrolysis of the methylene-0,0′-bis (ethylacethydroximate) component. Generally, reaction times of from about 15 minutes to 24 hours at temperature from about 0° to 100°C have been found suitable. A solvent such as ethanol, ether, tetrahydrofuran, nitromethane, diglyme or glyme, as well as other suitable solvents of similar polarity, may be used as the solvent component.

Hydrolysis of the methylene-0,0′-bis (ethylacethydroximate) component with perchloric acid gives methylenedioxyamine diperchlorate. Hydrolysis with other acids such as hydrochloric acid, hydrobromic acid, nitric acid, sulfuric acid, nitroform and picric acid will give the corresponding salts of methylenedioxyamine such as the dihydrochloride, the dihydrobromide, the dinitrate, the disulfate, dinitroformate and the dipicrate.

Alternatively, the acid salts of methylenedioxyamine may be produced by titration of this base with an appropriate acid in a suitable solvent. This procedure is in practice a method of preparation which leads to easier purification of the salts. The various salts could be prepared by metathesis reactions of the dihydrochloride or sulphate salts prepared as described in this embodiment with suitable substrates such as silver perchlorate, silver nitrate or other appropriate salts.

Accordingly, the primary object of this invention is to provide for a new series of compounds and a method for their preparation.

Another object of this invention is to provide a method for the synthesis of the acid salts of methylenedioxyamine.

The above and still other objects and advantages of this invention will become readily apparent upon consideration of the following detailed description thereof.

DESCRIPTION OF THE PREFERRED EMBODIMENT

In accordance with this invention, it has been found that the above noted objects can be accomplished by a reaction which involves the acid hydrolysis of methylene-0,0′-bis (ethylacethydroximate). The reaction which is believed to take place during the synthesis of the novel compounds of this invention is illustrated by the following schematic representation:

(I)

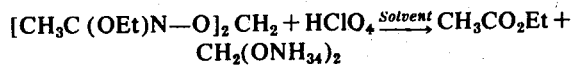

$$[CH_3C(OEt)N-O]_2CH_2 + HClO_4 \xrightarrow{Solvent} CH_3CO_2Et + CH_2(ONH_{3,4})_2$$

As mentioned hereinabove, in order to effect the synthesis of the series of novel compounds of this invention, methylene-0,0′-bis (ethylacethydroximate) is hydrolized at a temperature ranging from 0° to 100°C over a period of time ranging from about 15 minutes to 24 hours. Hydrolysis with an appropriate acid and water is effected in a suitable solvent such as ethanol, ether or other solvent of similar polarity. The utilization of perchloric acid, as the acid component, gives methylenedioxyamine diperchlorate. This is an energetic compound containing both the elements of an oxidizer and a fuel making it an explosive. It is especially valuable as a solid propellant oxidizer because of its high oxygen content. The use of the other acids mentioned hereinabove, as the acid component, will yield the corresponding salts of methylenedioxyamine in the same manner as that taught by the following example which utilizes perchloric acid as the specific acid component.

In order to further illustrate to those skilled in the art the best mode of operation for the present invention, there is presented the following detailed example. It is to be understood, however, that this example is presented for purposes of illustration only, and is not to be considered as limiting the invention in any way.

EXAMPLE

To 50 ml of absolute ethanol was added 2.0g (0.00717 mole) of methylene-0,0′-bis (ethylacethydroximate) and 2.6g of 70–72 percent perchloric acid (0.0165 mole). The mixture was stirred and warmed to approximately 40°C for 18 hours. A 20 ml portion of benzene was added to the reaction mixture and the mixture was distilled. The distillate, 10 ml of benzene, water, ethanol azeotrope (bp 64.5 percent C) and 25 ml of benzene ethanol azeotrope (bp 64.5°–77°C was discarded and the remaining ethanol product mixture was stripped of ethanol on a rotovap at reduced pressure. The semi-solid residue was taken up in 30 ml of ether and stirred for 10–15 min. The ether layer was decanted and the residue dried in vacuo at 1 mm for 72 hours. The resultant white solid, methylenedioxyamine diperchlorate weighed 2.34 g (91 percent) and a melting point of 115°C. The product was further identified through infrared absorption, nuclear magnetic resonance spectroscopy and elemental analysis with the following results:

$\lambda_{max}^{KBr}$ 5.2$\mu$ (w), 11.43 (m); nmr (DDMSO 85 mg./ml., 4.61 singlet;

(2-O-CH$_2$-protons), 0.95 singlet (6-NH$_3$ClO$_4$ protons). Analysis calculated for C$_1$H$_8$Cl$_2$N$_2$O$_{10}$; C, 4.30; H, 2.87; N, 10.03; Found to be: C, 4.99; H, 2.9 2; N, 10.58. Washing this white solid with chloroform gave the diperchlorate with a melting point of 118°C and an analysis of C, 4.66; H, 2.82; N, 10.04.

We claim:

1. A method for synthesizing the acid salts of methylenedioxyamine which comprises the steps of (1) effecting a reaction between (a) a solvent mixture of methylene-0,0'-bis (ethylacethydroximate) and (b) an acid selected from the group consisting of perchloric acid, hydrochloric acid, hydrobromic acid, nitric acid, sulfuric acid, nitroform and picric acid, (2) continuing said reaction at a temperature and for a period of time sufficient to effect the hydrolysis of the said methylene-0,0'-bis (ethylacethydroximate) and (3) separating the hydrolytic reaction product from said mixture.

2. The compound, methylenedioxyamine diperchlorate.

3. The compound, methylenedioxyamine dihydrochloride.

4. The compound, methylenedioxyamine dihydrobromide.

5. The compound, methylenedioxyamine dinitrate.

6. The compound, methylenedioxyamine disulfate.

7. The compound, methylenedioxyamine dipicrate.

8. The compound, methylenedioxyamine dinitroformate.

* * * * *